July 26, 1955          B. J. CRAIG          2,713,846
APPARATUS FOR MAKING A COMPOSITION
Original Filed June 9, 1944
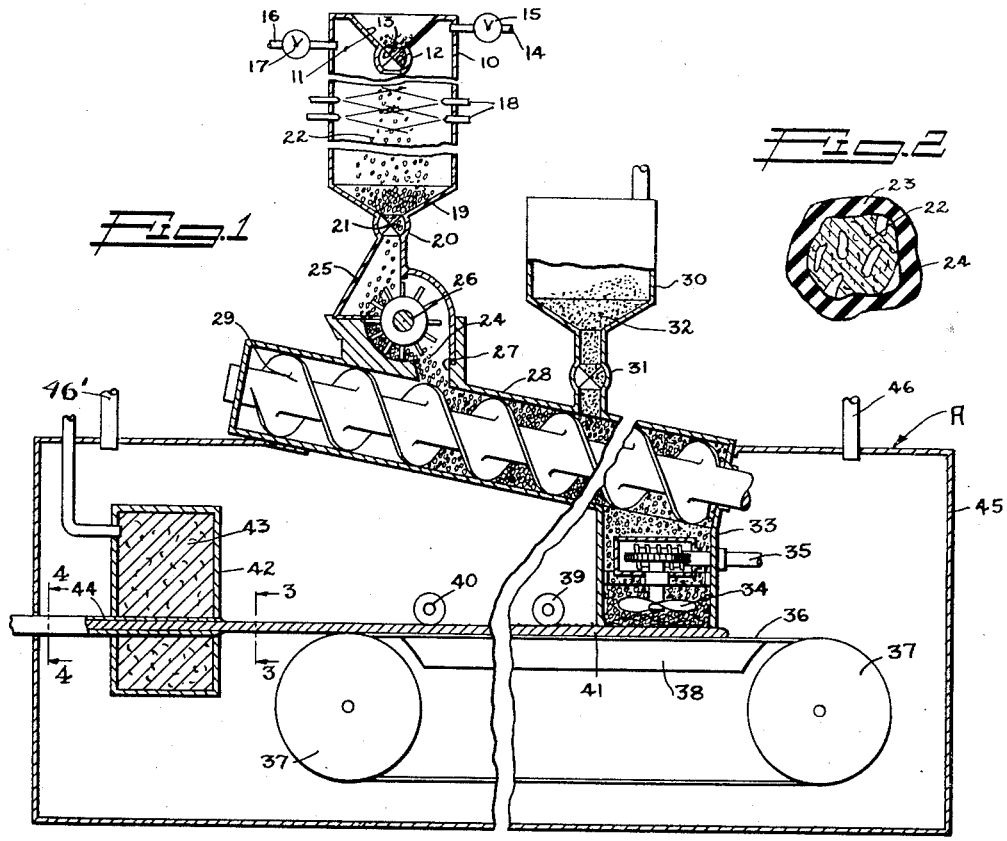
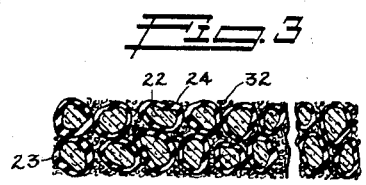
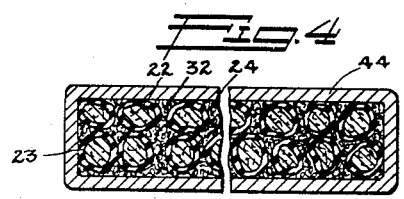
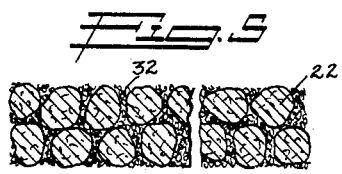
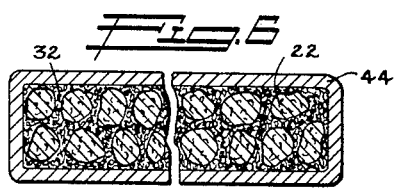
INVENTOR.
B. J. Craig United States Patent Office
2,713,846
Patented July 26, 1955

2,713,846

APPARATUS FOR MAKING A COMPOSITION

Burnie J. Craig, Pasadena, Calif.

Original application June 9, 1944, Serial No. 539,589, now Patent No. 2,631,355, dated March 17, 1953. Divided and this application January 26, 1953, Serial No. 333,263

23 Claims. (Cl. 118—64)

In the manufacture of composition cork the comminuted cork is mixed with a binder and the mixture is fed to a suitable forming machine or die. Care must be taken to insure a thorough mixing and there should be no swelling or distorting of the cork particles or any premature insolubilizing of the binder.

Also, in the manufacturing cork composition, when the binder and cork particles are mixed, there is a tendency for the binder to enter the pores of the cork and remain in the pores and there is also a tendency for the binder to enter the pores during the molding or other treating of the composition in the steps of making the finished product.

It is one of the objects of this invention to provide a novel apparatus for making a composite cork preparation which overcomes the difficulties mentioned and which has desirable physical properties.

An additional object of the invention is to provide a novel apparatus for making a porous composition.

A further object of the invention is to provide a novel apparatus for making a cork composition wherein cork particles, while in an atmosphere of gas above atmospheric pressure, are mixed with a binder, after which the binder is insolubilized.

A further object of the invention is to provide a novel apparatus wherein porous particles, while containing gas, are individually or in groups covered with a film which entraps the contained gas.

An additional object of the invention is to provide a novel apparatus for making an improved composition including particles wherein the particles contain entrapped gas which may have a pressure greater than atmospheric pressure.

A further object of the invention is to provide a novel apparatus for making a composition wherein particles, while containing gas under pressure, are mixed with a binder and thereafter the pressure exterior to the composition is reduced to permit the entrapped gas to expand so that it tends to force binder from the pores of the particles.

A further object of the invention is to provide a novel apparatus for making a composition wherein porous particles, while containing a gas under pressure, are mixed with a binder and thereafter the pressure exterior to the composition is reduced to less than that of the entrapped gas, thus permitting the entrapped gas to expand and to force binder from the pores of the particles, after which the binder is insolubilized.

Another object of the invention is to provide a novel apparatus for making a composition wherein porous particles, while containing gas under pressure above atmospheric, are individually or in groups covered with a film which entraps the contained gas, after which the gas entrapping particles are secured together to form a composition or a thread-like member.

Another object of the invention is to provide a novel apparatus for making a composition wherein porous particles, while containing gas under pressure above atmospheric, are individually or in groups covered with a film which entraps the contained gas, after which the gas entrapping particles are mixed with a binder under pressure conditions which may permit the entrapped gas to expand.

A further object of the invention is to provide a novel apparatus for making a cellular system.

Other objects and advantages of the invention will be apparent from the following description taken in connection with the accompanying drawings, wherein:

Fig. 1 is a central sectional view through an apparatus embodying the features of the invention;

Fig. 2 is a sectional view showing one of the particles;

Fig. 3 is a section taken on line 3—3, Fig. 1, showing the material;

Fig. 4 is a section taken on line 4—4, Fig. 1, showing the material;

Fig. 5 is a view similar to Fig. 3, showing material when the individual covering for the particles is omitted, and Fig. 6 is a view similar to Fig. 4, showing material when the individual covering for the particles is omitted.

Referring to the drawing by reference characters, an apparatus embodying the features of the invention is indicated generally at A. This apparatus includes a housing 10, having a funnel shaped container 11 in the top thereof. The container has a cylindrical hopper portion 12 at the bottom thereof in which a rotating hopper gate 13 is mounted. The interior of the housing communicates with a gas pressure conduit 14 and with a constant pressure outlet valve 15 which determines the minimum air pressure within the housing 10. Also communicating with the interior of the housing 10 I show an outlet 16 with a constant pressure inlet valve 17 therein which determines the maximum pressure within the housing.

Extending into the housing I show a plurality of injection jets 18. The bottom of the housing is tapered inwardly as at 19 and has a cylindrical hopper portion 20 at the bottom thereof in which a rotating hopper gate 21 is mounted.

In operation, porous particles 22 are placed in the container 11 while gas under pressure is maintained within the housing 10 by means of the conduit 14 and is maintained at a desired pressure by means of the valves 15 and 17. As the rotating hopper gate 13 is rotated, the small particles of porous material are allowed to fall into the housing and through the path of the sprays where they become coated with covering material. As the particles fall they may be vulcanized or cured so that when the particles reach the bottom portion of the housing they may be removed by means of the rotating hopper gate 21. Thus it may be seen that compressed gas is entrapped in the pores of the porous particles and sealed therein by the coating of material 23 about each particle as shown in Fig. 2.

The members 24, formed as described, are compressible as well as resilient and elastic due to the contained gas and due to their natural properties.

The porous particles pass from the gate 21 to a discharge spout 25, whence they pass through a distributor 26 which is preferably regulated to run at a proper speed so that the particles are fed evenly. From the distributor 26 the particles pass through a discharge portion 27 into a cylindrical member 28 which contains a conveyor, shown as a rotating screw 29, which is suitably driven to rotate and to advance the particles 24 along the member 28.

A hopper 30, having a discharge feed valve 31 therein, communicates with the member 28. The hopper 30 receives a binder element 32 which is discharged on the particles within the member 28. The member 28 includes a discharge portion 33 which includes an impeller 34 driven by a suitable means 35. The impeller 34 agitates and forces along the mixture of binder and particles 24 and discharges the material onto a conveyor 36 which runs over drums 37 whose upper reach is supported by a table 38. Rollers 39 and 40 serve to smooth the composition which is indicated at 41. The composition may advance through a coating chamber 42 which contains a coating or covering material 43. The chamber 42 has opposed slots of slightly greater area than the cross section area of the composition 41, so that the coating 44 is applied about the composition as the latter passes through the chamber 42.

The gas in the container 10 has a pressure preferably above that of the atmosphere and, since the parts are enclosed, the gas entrapped in the particles 24 has a pressure above atmospheric. The binder is fed into the chamber 28 under a pressure which is preferably equal to the pressure of the entrapped gas, so that upon the mixing of the binder and particles there is no tendency for a change in volume of the particles. The conveyor 36 and associated parts are arranged in a container 45 in which an evaporative atmosphere and a coagulating vapor may be maintained at a desired pressure by pipes 46 and 46'. As stated above an evaporative atmosphere or a coagulating vapor is maintained in the container 45 and as the coated particles and binder advance they are forced downwardly by the impeller 34 so that the particles and binder are under pressure as they are discharged onto the belt 36. The rollers 39 and 40 further compress the material and the heat and pressure form the material into a self-supporting sheet so that the material in sheet form bridges the gap between the drum 37 and the entrance to the coating chamber 42. The compacted sheet is advanced by the belt so that it passes through the coating chamber.

The pressure in the container 45 is preferably less than the pressure of the gas entrapped in the particles, so that when the plastic composition becomes subject to the pressure in the container 45 the drop in pressure will cause the particles to expand as the gas contained therein expands.

The manner in which the particles are united and/or treated and/or finished will depend upon the intended use of the finished composition. For example, in the composition shown in Fig. 3 the coated, gas entrapped members 24 are secured together by a binder 32, but there is no outside cover. Omission of a supply of coating material 43 provides this type. In Fig. 4 the composition is the same as that shown in Fig. 3 except that an outside coating 44 is provided. In Fig. 5 the coating 23 and coating 44 are omitted to provide a composition which includes air entrapped particles 22, held by a binder 32. In Fig. 6 the composition is the same as that shown in Fig. 5 except that an outside coating 44 is applied.

The porous particles may consist of comminuted cork, sponge rubber, wood pitch or natural sponge.

The entrapped gas may be air, nitrogen, hydrogen, oxygen or carbon dioxide.

The covering material may be regenerated cellulose formed from viscose, lowly etherified or esterified cellulose derivatives, soluble in aqueous alkaline solution such as lowly etherified methyl, ethyl or glycol cellulose, and lowly esterified cellulose acetate, highly esterified cellulose derivatives soluble in organic solvents such as cellulose acetate, cellulose propionate, cellulose acetate-propionate, methyl, ethyl, ethyl or benzyl cellulose, colloidal dispersions of protein such as casein, gelatin and the like. Other material such as artificial resins of various kinds may be used.

The covering material might also be natural rubber or a synthetic of the butadiene co-polymer type such as Buna S rubber, a synthetic of the chloroprene polymer type, such as neoprene, a synthetic of the isobutylene poloymer type having small quantities of other diolifines such as isoprene or butadiene, such as Butyl rubber or a plasticized vinyl chloride polymer, such as Koroseal. The natural or artificial rubber may be employed in latex form with the latices applied to the particles in sufficient quantities to provide the necessary thickness.

The binder and/or the material which secures the particles to the core may be a thermosetting type such as urea, phenolic or alkyd resinous materials or albumens or proteins treated with a material to insolubilize them upon heating, or other types of binders may be employed as, for example, raw natural rubber which may be vulcanized for the binding effect; also latices may be employed as binders and regenerated cellulose formed from viscose may be employed.

The covering material with the contained particles may be extruded into a coagulating bath or into an evaporating atmosphere so that the material will have the desired physical characteristics.

This application is a division of application Ser. No. 539,589 filed June 9, 1944, now Patent No. 2,631,355 granted March 17, 1953.

Having thus described the invention I claim:

1. An apparatus for making a composition comprising means to apply a complete covering to porous particles, means to supply raw binder material to the covered particles, means to work the binder and covered particles into a compacted mass and means to subject the binder to a finishing agent.

2. An apparatus for making a composition which includes porous particles comprising means to provide a covering on the particles, means to provide a raw binder for the particles, means to work the binder and particles, and means to subject the binder to a finishing agent.

3. An apparatus for making a composition comprising means to apply a covering to porous particles, means to supply raw binder material about the covered particles, means to work the material, and means to subject the binder to a finishing agent.

4. An apparatus for making a composition comprising a container for covered porous particles, means to advance and to thereafter supply raw binder material to the covered particles, means to work the raw binder and covered particles, and means to subject the binder to a finishing agent.

5. An apparatus for making a composition comprising means to feed porous covered particles to a conveyor, means to supply raw binder material to the covered particles while being moved by the conveyor, means to work the raw binder and particles, and means to apply a finishing agent to the binder.

6. An apparatus for making a composition comprising a particle container, means to conduct gas under pressure to the particles in the container, means to provide an independent covering on each particle while in the container, means to apply raw binder material to the covered particles, means to work the raw binder and particles, and means to apply a finishing agent to the binder.

7. An apparatus for making a composition comprising means to cause porous particles to move and to be separated, means to apply a cover to each particle while it is moving and separated from the other particles, means to supply raw binder material to the covered particles, and means to apply a finishing agent to the binder.

8. An apparatus for making a composition comprising means to cause porous particles to move and to be separated, means to apply a cover to each particle while it is moving and separated from the other particles, means to thereafter reassemble the particles, means to supply raw binder material to the covered reassembled particles, and means to apply a finishing agent to the binder.

9. An apparatus for making a composition comprising means to cause porous particles to move and to be separated, means to apply a cover to each particle while it is moving and separated from the other particles, means to apply a raw binder to the covered particles, means to work the binder and particles, and means to apply a finishing agent to the binder.

10. An apparatus for making a composition comprising means to feed porous, flexible particles to a conveyor, means to supply raw binder material to the flexible particles while being moved by the conveyor, means to work the raw binder and flexible particles, means to apply a finishing agent to the binder, and means to subject the material to fluid pressure while it is being finished.

11. An apparatus for making a composition comprising a conveyor, means to deliver covered particles to the conveyor, means to supply raw binder material to the particles being conveyed by the conveyor, a second conveyor adapted to receive binder and covered particles from the first conveyor, means to work the material on the last mentioned conveyor, and means to apply a finishing agent to the worked material.

12. An apparatus for making a composition comprising a container for covered particles, a distributor disposed to receive covered particles from the container, a conveyor disposed to receive covered particles from the distributor, means to supply raw binder material to the particles being conveyed by the conveyor, a finishing chamber adapted to receive binder and covered particles from the conveyor, and means to apply a finishing agent to material in the finishing chamber.

13. An apparatus for making a composition comprising a particle container, means to conduct gas under pressure into the container, means to provide an independent covering on each particle while in the container, means to supply raw binder material to the particles, means to apply a finishing agent to the binder.

14. An apparatus for making a composition comprising a particle container, means to feed porous particles to the container, means to provide a complete covering and binding material about each particle while in the container, means to work the particles and means to apply a finishing agent to the raw binder.

15. An apparatus for making a composition comprising a particle container, means to feed porous particles to the container, means to supply gas under pressure to the particles in the container, means to provide a gas impervious covering to the particles while in the container, means to supply raw binder material to the particles, means to work the raw binder and particles, means to apply a finishing agent to the binder, means to control the pressure on the binder and particles while being worked and means to coat the bound particles.

16. An apparatus for making a composition comprising a particle container, means to feed porous particles to the container, means to supply gas under pressure to the container, means to provide a covering on the particles while in the container, a conveyor, means to discharge covered particles from the container to the conveyor, means to supply binder material to the particles being conveyed by the conveyor, a discharge chute communicating with the conveyor, means to direct material from the conveyor through the discharge chute, a second conveyor for receiving material from the discharge chute, and means to work the material on the last mentioned conveyor.

17. An apparatus for making a composition comprising means to cause each porous particle of a group of porous particles to move and to be separated from others in the group of particles, means to cause each particle while it is moving and separated from the other particles to be enveloped by a covering, means to supply raw binder material about the covered particles, and means to apply a finishing agent to the binder.

18. An apparatus for making a composition comprising means to cause each porous particle of a group of porous particles to move and to be separated from others in the group of particles, and while each particle is moving and separated from the other particles, to cause each separated individual particle to be enveloped by a covering, means to thereafter bring each covered particle into proximity with the other covered particles from which it has been separated, means to thereafter supply raw binder material to the covered and reassembled particles, means to apply a finishing agent to the binder and means to subject the material being finished to fluid pressure.

19. An apparatus for making a composition comprising a particle container, means to feed porous particles to the container, means to supply gas under pressure to the container, means to provide a covering for the particles while in the container, a conveyor, means to discharge covered particles from the container to the conveyor, means to supply binder material to the particles being conveyed by the conveyor, a discharge chute communicating with the conveyor, means to direct material from the conveyor through the discharge chute, a second conveyor for receiving material from the discharge chute, means to work the material on the last mentioned conveyor, and coating means in advance of the last mentioned conveyor and adapted to coat material from the last mentioned conveyor.

20. An apparatus for making a composition comprising a particle container, means to provide a covering about the particles while in the container, a distributor disposed to receive covered particles from the container, a conveyor disposed to receive covered particles from the distributor, a housing for the conveyor, means to supply raw binder material to the particles being conveyed by the conveyor, a second conveyor disposed to receive material from the first conveyor, a finishing chamber about said second conveyor, means to apply a finishing agent to material in the finishing chamber, means to work material on the second conveyor, and a coating chamber including an inlet adapted to receive material from the second conveyor and an outlet for discharging the coated material, and means to supply coating material to the coating chamber.

21. An apparatus for making a porous composition comprising a particle container, means to feed porous particles to the container, means to provide a covering about the particles while in the container, means to discharge covered particles from the container, a distributor disposed to receive covered particles from the discharge means, a spiral conveyor disposed to receive covered particles from the distributor, a cylindrical housing for the spiral conveyor, means to supply binder material to the particles being conveyed by the spiral conveyor, said housing having a discharge chute, a conveyor beneath the discharge chute and disposed to receive material from the discharge chute, a finishing chamber about said last mentioned conveyor, means to subject material in the finishing chamber to a finishing agent, means to force material from the discharge chute onto the last mentioned conveyor, means to work material on the last mentioned conveyor, a coating chamber, said coating chamber including an inlet adapted to receive bound material from the last mentioned conveyor and an outlet for discharging the coated material, and means to supply coating material to the coating chamber.

22. An apparatus for making a porous composition comprising a particle container, means to maintain a supply of gas under pressure in the container, means to feed porous particles to the container, means to provide a covering about the particles while in the container, valved means to discharge covered particles from the container, a distributor disposed to receive covered particles from the valved means, a spiral conveyor disposed to receive covered particles from the distributor, a cylindrical housing for the spiral conveyor, a binder hopper, said hopper having a valved discharge chute communicating with the housing to direct binder material onto the particles being conveyed by the spiral conveyor, said housing having a discharge chute, a conveyor beneath the discharge chute and disposed to receive material from the discharge chute, a finishing chamber about said last mentioned conveyor, means to subject material in the finishing chamber to a finishing agent, means to force material from the discharge chute onto the last mentioned conveyor, a smoothing roller above the last mentioned conveyor, a coating chamber in advance of the roller, said coating chamber including an inlet adapted to receive material from the last mentioned conveyor and an outlet for discharging the coated material, means to supply coating material to the coating chamber, and means to maintain in the finishing chamber a supply of gas at a pressure less than the pressure in the particle container.

23. An apparatus for making a porous composition comprising a container, means to feed porous particles to the container, means to supply gas under pressure to the container, means to provide a covering on the particles while in the container, a conveyor, means to discharge covered particles from the container to the conveyor, means to supply binder material to the particles being conveyed by the conveyor, a discharge chute communicating with the conveyor, means to direct binder material and particles from the conveyor through the discharge chute, a conveyor beneath the discharge chute and disposed to receive material from the discharge chute, a roller above the last mentioned conveyor, coating means in advance of the roller, said coating means including an inlet adapted to receive material from the last mentioned conveyor.

References Cited in the file of this patent

UNITED STATES PATENTS

| | | |
|---|---|---|
| 2,270,341 | Ransburg | Jan. 20, 1942 |
| 2,517,724 | Schuh | Aug. 8, 1950 |
| 2,560,420 | Dodge | July 10, 1951 |
| 2,579,770 | Uschmann | Dec. 25, 1951 |
| 2,579,944 | Marshall | Dec. 25, 1951 |